(12) United States Patent
Ricciuti et al.

(10) Patent No.: US 9,590,396 B2
(45) Date of Patent: Mar. 7, 2017

(54) CIRCUIT BREAKER PANEL BOARD INCLUDING ILLUMINATION UNIT

(71) Applicant: EATON CORPORATION, Cleveland, OH (US)

(72) Inventors: Anthony Thomas Ricciuti, Bethel Park, PA (US); Thomas Kenneth Fogle, Pittsburgh, PA (US); Joe Philip Fello, Verona, PA (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/710,781

(22) Filed: May 13, 2015

(65) Prior Publication Data

US 2016/0336721 A1    Nov. 17, 2016

(51) Int. Cl.
| | |
|---|---|
| H02B 1/42 | (2006.01) |
| H02B 1/38 | (2006.01) |
| F21V 13/00 | (2006.01) |
| F21L 4/02 | (2006.01) |
| H02B 1/44 | (2006.01) |
| H02B 1/48 | (2006.01) |

(52) U.S. Cl.
CPC ............. *H02B 1/42* (2013.01); *H02B 1/38* (2013.01); *F21L 4/02* (2013.01); *F21V 13/00* (2013.01); *H02B 1/44* (2013.01); *H02B 1/48* (2013.01)

(58) Field of Classification Search
CPC  H05K 5/00; H05K 15/00; F21V 33/00; F21L 4/02; F21L 4/00; B61L 25/08; H02B 1/00–1/565
USPC ....... 361/601, 602, 622, 627, 632, 634, 641, 361/644, 654, 673; 362/95, 183, 184, 362/253, 85; 340/286.13, 568.1, 584, 340/639; 174/520, 535, 559
See application file for complete search history.

(56) References Cited

U.S. PATENT DOCUMENTS

| | | | | |
|---|---|---|---|---|
| 4,546,418 | A * | 10/1985 | Baggio | H02B 1/50 361/652 |
| 4,706,073 | A * | 11/1987 | Vila Masot | G08B 21/185 337/206 |
| 7,616,096 | B1 * | 11/2009 | Sorensen | H01H 71/04 340/286.13 |
| 8,591,065 | B2 * | 11/2013 | Baer | H02B 1/306 307/126 |
| 2005/0162281 | A1 | 7/2005 | Capon | |
| 2012/0268919 | A1 * | 10/2012 | Yang | F21L 4/02 362/95 |
| 2013/0039034 | A1 * | 2/2013 | Baer | H02B 1/306 362/95 |

FOREIGN PATENT DOCUMENTS

WO    2011/085729 A1    7/2011

OTHER PUBLICATIONS

European Patent Office, "International Search Report and Written Opinion", PCT/US2016/032246, Aug. 11, 2016, 9 pp.

* cited by examiner

*Primary Examiner* — Zachary M Pape
(74) *Attorney, Agent, or Firm* — Eckert Seamans; Nathaniel Wilks; Grant Coffield (57) ABSTRACT

A circuit breaker panel board includes a housing including a door structured to open, a circuit breaker receiving area disposed in an interior area of the housing, and at least one illumination unit disposed outside the circuit breaker receiving area and including at least one light oriented to provide light in a direction of the circuit breaker receiving area.

16 Claims, 6 Drawing Sheets

CIRCUIT BREAKER PANEL BOARD INCLUDING ILLUMINATION UNIT

BACKGROUND

Field

The disclosed concept relates generally to circuit breaker panel boards, and more particularly, to circuit breaker panel boards including an illumination unit.

Background Information

Circuit breaker panel boards are configured to receive numerous circuit breakers. In applications such as residential circuit breakers, the lighting in the vicinity of the circuit breaker is not independent of the circuit breaker. That is, if the power at the circuit breaker goes out, power to any lighting will also go out. Furthermore, the lighting in the vicinity of the circuit breaker may be associated with a circuit breaker in the panel board. Thus, when the circuit breaker trips, power to the lighting is cut off.

In power outages, or in the event that power is cut due to a circuit breaker tripping, residents will want to check the circuit breaker panel board to see if any of the circuit breakers have tripped. However, the area around the circuit breaker may be dark if power to the lighting around the circuit breaker is cut. Thus, a resident would need to bring a flashlight or other light source to be able to see the status of the circuit breakers in the circuit breaker panel. This creates an inconvenience for the resident, and can also create a hazardous condition if the resident attempts to ascertain the status of the circuit breakers with insufficient lighting. Additionally, lighting around the circuit breaker panel board may not be oriented in a manner that provides adequate illumination for safely approaching the circuit breaker panel board and working on circuit breakers.

There is thus room for improvement in circuit breaker panel boards.

SUMMARY

These needs and others are met by embodiments of the disclosed concept, which are directed to a circuit breaker panel board including an illumination unit having lights oriented in a direction toward a circuit breaker receiving area.

In accordance with aspects of the disclosed concept, a circuit breaker panel board comprises: a housing including a door structured to open; a circuit breaker receiving area disposed in an interior area of the housing, wherein the door is structured to open to provide access to the circuit breaker receiving area; and at least one illumination unit disposed outside the circuit breaker receiving area and including at least one light oriented to provide light in a direction of the circuit breaker receiving area.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 1:
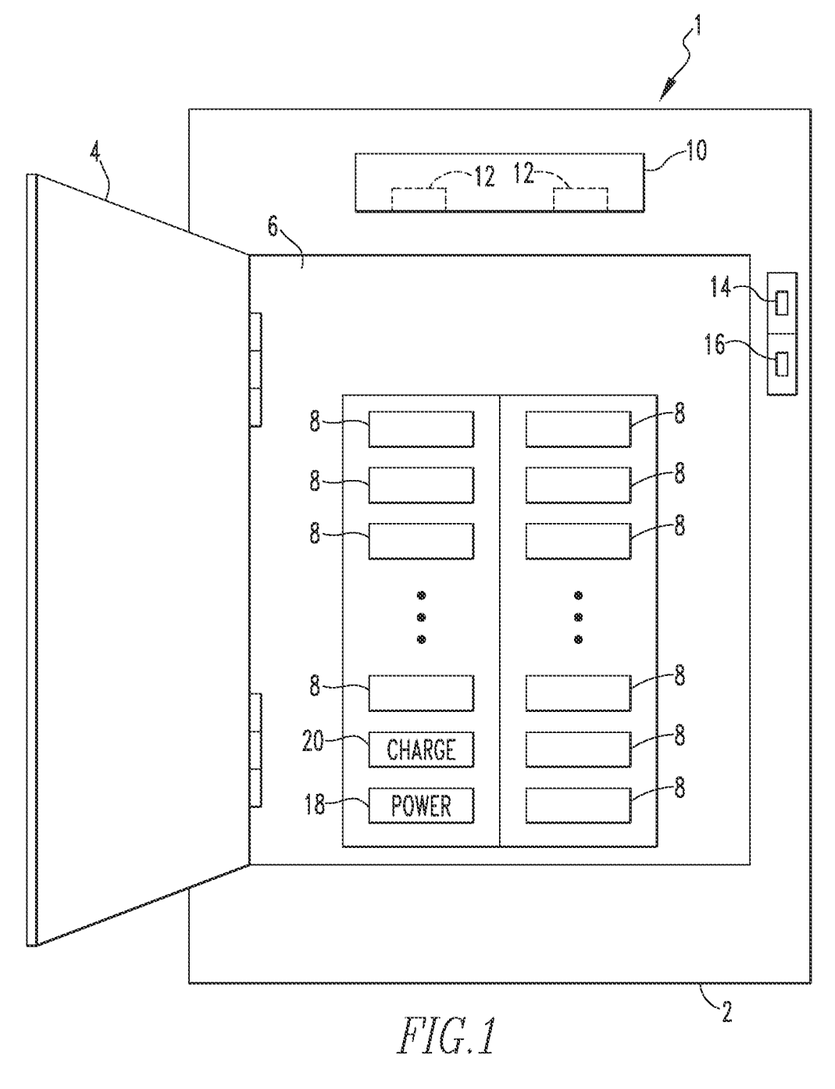
FIG. 1 is a stylized diagram of the front of a circuit breaker panel board in accordance with an example embodiment of the disclosed concept.
Figure 2:
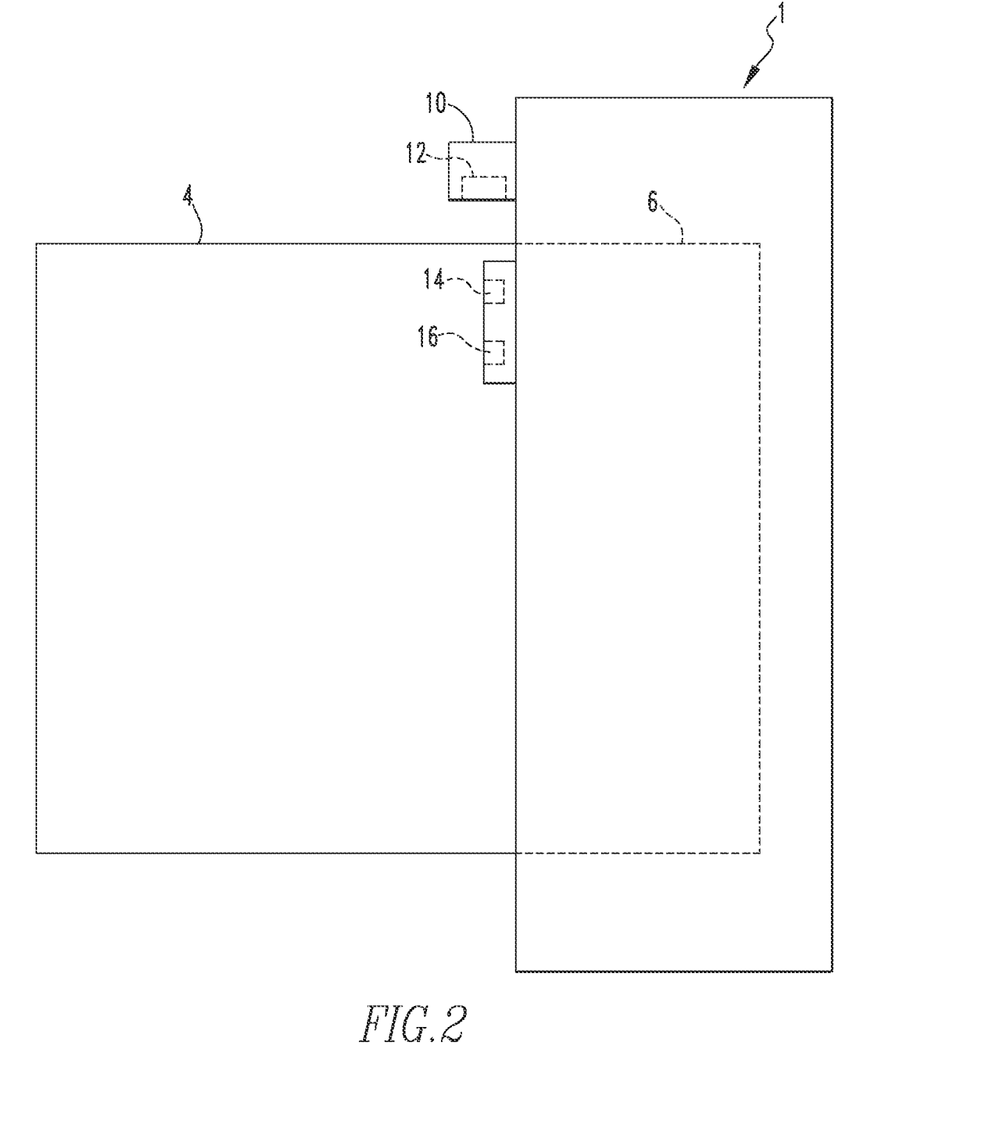
FIG. 2 is a stylized diagram of a the side of the circuit breaker panel board of FIG. 1.

FIG. 1 is a stylized diagram of the front of a circuit breaker panel board 1 in accordance with an example embodiment of the disclosed concept and FIG. 2 is a stylized diagram of the side of the circuit breaker panel board 1 of FIG. 1. The circuit breaker panel board 1 includes a housing 2 including a door 4. The door 4 is structured to open to provide access to a circuit breaker receiving area 6 disposed in an interior area of the housing 2. Closing the door 4 covers the circuit breaker receiving area 6.

The circuit breaker receiving area 6 in structured to receive a number of circuit breakers. The circuit breakers may be installed in slots 8 located in the circuit breaker receiving area 6. The slots 8 may have shapes corresponding to the shape of the circuit breakers.

The circuit breaker panel board 1 further includes an illumination unit 10 disposed on the housing 2 outside of the circuit breaker receiving area 6. The illumination unit 10 is disposed on the housing 2 at an area above the circuit breaker receiving area 6. The illumination unit 10 includes a number of lights 12. The lights 12 are oriented so as to face the circuit breaker receiving area 6, and thus provide illumination to the circuit breaker receiving area 6. In this example embodiment of the disclosed concept, the lights 12 are oriented downward. However, it is contemplated that the illumination unit 10 may be disposed at other areas relative to the circuit breaker receiving area 6 without departing from the scope of the disclosed concept. For example and without limitation, the illumination unit 10 may be disposed below the circuit breaker receiving area 6 with lights 12 oriented upward, or the illumination unit 10 may be disposed to the right of the circuit breaker receiving area 6 with lights 12 oriented to the left.

In some example embodiments of the disclosed concept, the lights 12 are light emitting diodes. However, it is contemplated that any suitable type of light may be employed without departing from the scope of the disclosed concept. It is also contemplated that any number of lights 12 may be employed in the illumination unit 10 without departing from the scope of the disclosed concept. It is further contemplated that multiple illumination units 10 may be employed without departing from the scope of the disclosed concept. For example and without limitation, one illumination unit 10 may be disposed above the circuit breaker receiving area 6, another illumination unit 10 may be disposed to the right of the circuit breaker receiving area 6, and yet another illumination unit 10 may be disposed below the circuit breaker receiving area 6 (see FIG. 5).

In some example embodiments of the disclosed concept, the circuit breaker panel board 1 further includes a motion sensor 14 and a photo sensor 16. The motion sensor 14 is disposed on the housing 2 outside the circuit breaker receiving area 6 and is structured to sense motion in the vicinity of the circuit breaker panel board 1 (e.g., without limitation, a technician approaching the circuit breaker panel board 1). The photo sensor 16 is disposed on the housing 2 outside the circuit breaker receiving area 6 and is structured to detect ambient light in the vicinity of the circuit breaker panel board 1.

In some example embodiments of the disclosed concept, the circuit breaker panel board 1 includes only the motion sensor 14 and the illumination unit 10 is structured to turn on the lights 12 when the motion sensor 14 detects motion in the vicinity of the circuit breaker panel board 1. In some other example embodiments of the disclosed concept, the circuit breaker panel board 1 includes only the photo sensor 16 and the illumination unit 16 is structured to turn on the lights 12 when the photo sensor does not detect ambient light in the vicinity of the circuit breaker panel board 1. In yet other example embodiments of the disclosed concept, the circuit breaker panel board 1 includes both the motion sensor 14 and the photo sensor 16 and the illumination unit 10 is structured to turn on the lights 12 when the motion sensor 14 detects motion in the vicinity of the circuit breaker panel board 1 and the photo sensor 16 does not detect ambient light in the vicinity of the circuit breaker panel board 1. In some example embodiments of the disclosed concept, the illumination unit 10 is structured to turn off the lights 12 a predetermined period of time after the event that cause the illumination unit 10 to turn on the lights has cleared. For example and without limitation, the illumination unit 10 may turn off the lights 12 a predetermined period of time after the motion sensor 114 last detects motion in the vicinity of the circuit breaker panel board 1.

In some example embodiments of the disclosed concept, the circuit breaker panel board 1 further includes a power storage unit 18. The power storage unit 18 is a device that is structured to store power and to provide such power to the illumination unit 10 so that the illumination unit 10 may continue operating after the circuit breaker panel board 1 stops receiving external power. The power storage unit 18 may include any device suitable for storing power such as, without limitation, non-rechargeable batteries, rechargeable batteries, capacitors, or any other suitable device for storing power. The power storage 18 device may be installed in the circuit breaker panel board 1 in a variety of manners. For example and without limitation, the power storage unit 18 may be structured such that it may be installed in one of the slots 8 for receiving circuit breakers (e.g., without limitation, the power storage unit 18 is a 'dummy' circuit breaker). It is also contemplated that the power storage unit 18 may be independently mounted on the circuit breaker panel board 1 inside or outside the circuit breaker receiving area 6 (see FIG. 4). It is also contemplated that the power storage unit 18 may be an in-line device such as a power storage unit that does not have any external mounting other than two wires which may be located, for example and without limitation, at either end of the power storage unit. The power storage unit 18 may also be an accessory to other equipment installed in or on the circuit breaker panel board 1.

In example embodiments of the disclosed concept where the power storage unit 18 is rechargeable, a charging unit 20 may also be included in the circuit breaker panel board 1. The charging unit 20 is structured to charge the power storage unit 18. The charging unit 20 may use external power, such as line power received by the circuit breaker panel board 1, to charge the power storage unit 18. The charging unit 20 may be installed in the circuit breaker panel board 1 in a variety of manners. For example and without limitation, the charging unit 20 may be structured such that it may be installed in one of the slots 8 for receiving circuit breakers (e.g., without limitation, the charging unit 20 is a 'dummy' circuit breaker). It is also contemplated that the charging unit 20 may be independently mounted on the circuit breaker panel board 1 inside or outside the circuit breaker receiving area 6 (see FIG. 4). It is also contemplated that the charging unit 20 may be an in-line device or as an accessory to other equipment installed in or on the circuit breaker panel board 1.

Figure 3:
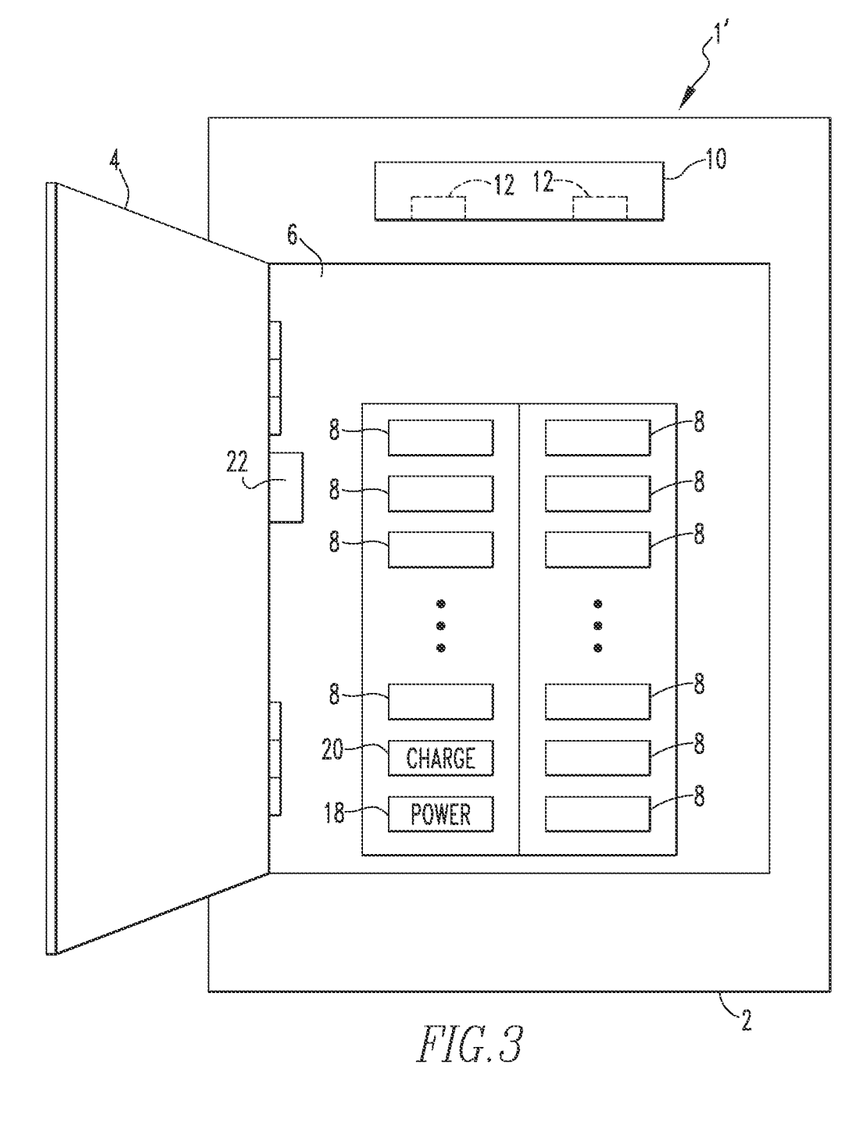
FIGS. 3-6 are stylized diagrams of fronts of circuit breaker panel boards in accordance with other example embodiments of the disclosed concept.

FIG. 3 is a stylized diagram of the front of a circuit breaker panel board 1' in accordance with another example embodiment of the disclosed concept. The circuit breaker panel board 1' of FIG. 3 is similar to the circuit breaker panel board 1 of FIG. 1. However, the circuit breaker panel board 1' of FIG. 3 does not include the motion sensor 14 or the photo sensor 16. Rather, the circuit breaker panel board 1' includes a door sensor 22.

The door sensor 22 is structured to detect when the door 4 is open. The door sensor 22 may be a switch or any other suitable device for detecting when the door 4 is open. In some example embodiments of the disclosed concept, the illumination unit 10 is structured to turn on the lights 12 when the door sensor 22 detects that the door is open and to turn off the lights when the door sensor 22 detects that the door is closed. The door sensor 22, and the motion sensor 14 and photo sensor 16 of FIG. 1, allow the illumination unit 10 to limit the amount of time that the lights 12 lights are turned on. This extends the lifespan of the lights 12 as well as the lifespan of the power storage unit 18.

Figure 4:
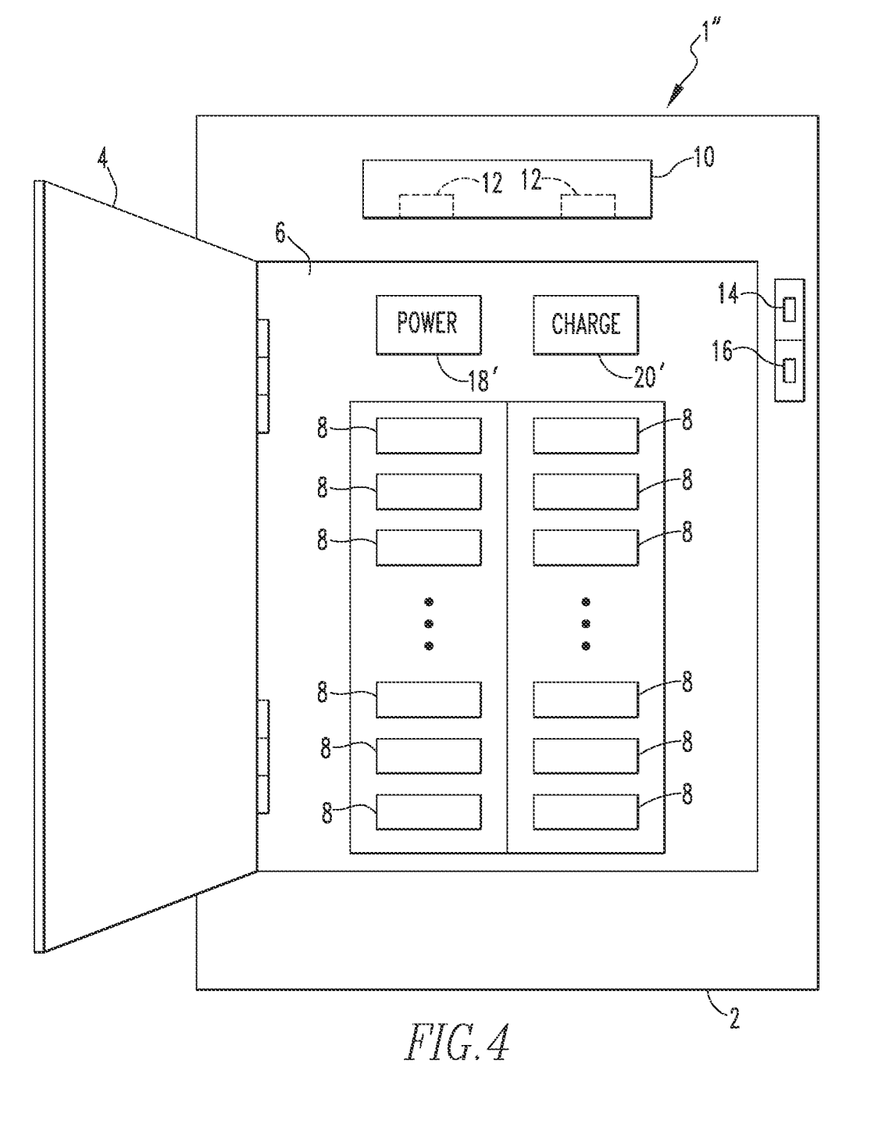

FIG. 4 is a stylized diagram of the front of a circuit breaker panel board 1" in accordance with another example embodiment of the disclosed concept. The circuit breaker panel board 1" of FIG. 4 is similar to the circuit breaker panel board 1 of FIG. 1. However, the circuit breaker panel board 1" of FIG. 4 includes a power storage unit 18' and a charging unit 20' that are independently installed inside the circuit breaker receiving area 6 rather than being installed in one of the slots 8.

Figure 5:
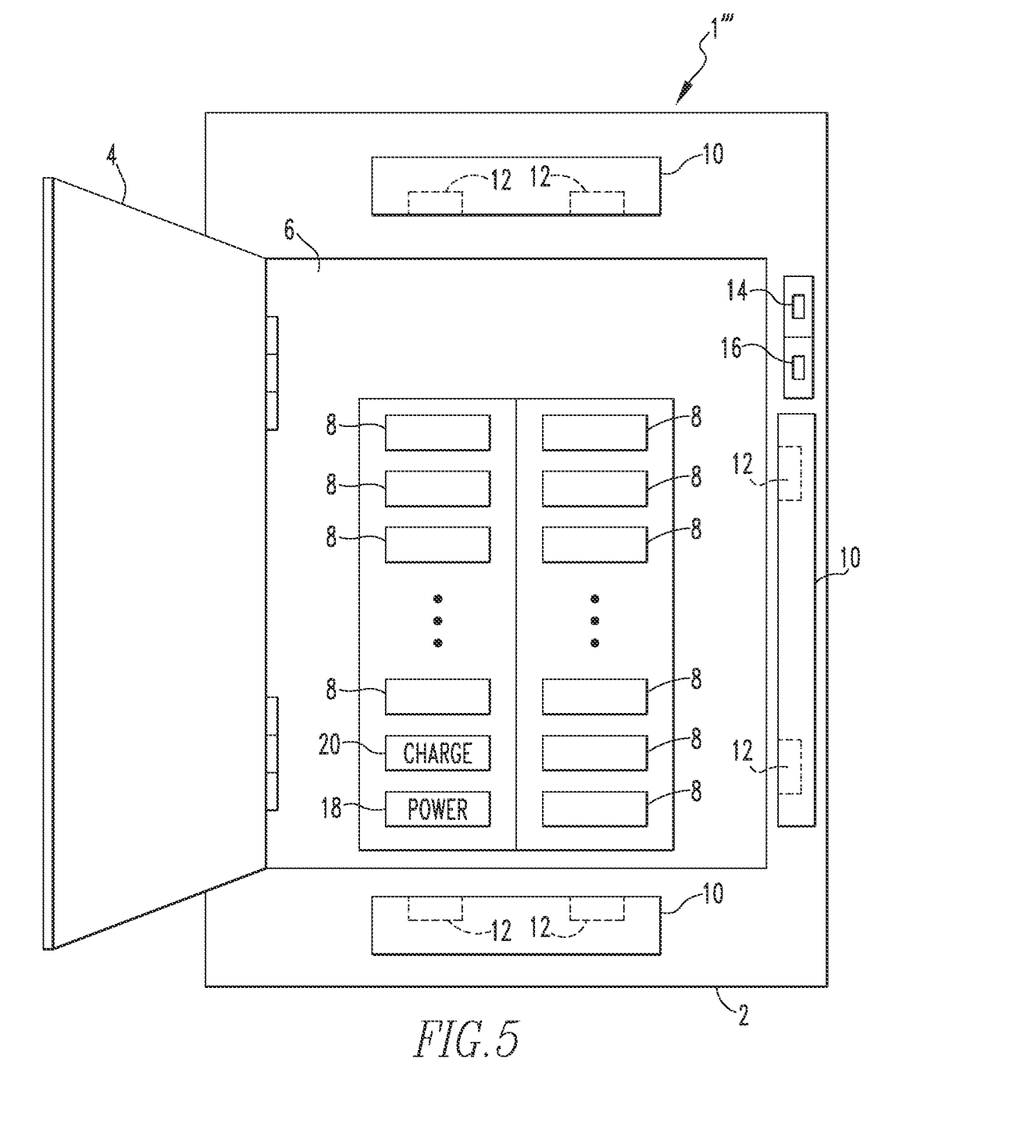

FIG. 5 is a stylized diagram of the front of a circuit breaker panel board 1''' in accordance with another example embodiment of the disclosed concept. The circuit breaker panel board 1''' of FIG. 5 is similar to the circuit breaker panel board 1 of FIG. 1. However, the circuit breaker panel board 1''' of FIG. 5 includes multiple illumination units 10 disposed outside the circuit breaker receiving area 6.

Figure 6:
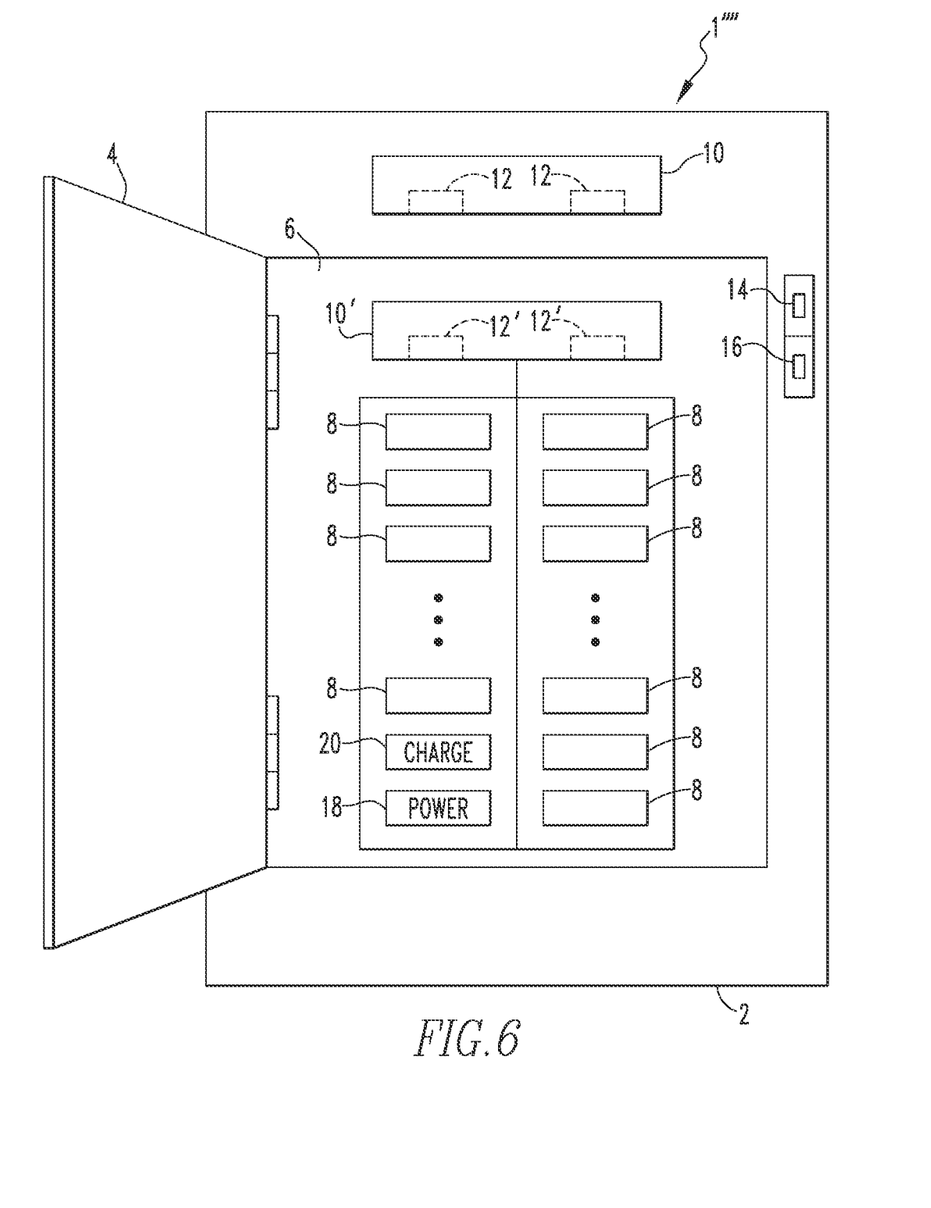

FIG. 6 is a stylized diagram of the front of a circuit breaker panel board 1'''' in accordance with another example embodiment of the disclosed concept. The circuit breaker panel board 1'''' of FIG. 6 is similar to the circuit breaker panel board 1 of FIG. 1. However, the circuit breaker panel board 1'''' of FIG. 6 includes a second illumination unit 10' and lights 12' disposed inside the circuit breaker receiving area 6. The second illumination unit 10' may operate similar to the illumination unit 10 disposed outside the circuit breaker receiving area. For example and without limitation, the second illumination unit 10' may turn on when the motion sensor 14 detects motion in the vicinity of the circuit breaker panel board 1'''', when the photo sensor 16 does not detect ambient light in the vicinity of the circuit breaker panel board 1'''', or when the door sensor 22 (see FIG. 3) detects that the door 4 is open.

In accordance with example embodiments of the disclosed concept, the illumination unit 10 provides illumination to the circuit breaker receiving area 6, when the door 4 is open, and to an area outside the circuit breaker receiving area 6. The illumination allows technicians to more easily work on the circuit breakers and to more safely approach the circuit breaker panel board 1. Also, in accordance with some example embodiments of the disclosed concept, the power storage unit 18 continues to provide power to the illumination unit 10 after external power to the circuit breaker panel board 1 has been removed. Thus, a technician does not have to bring an independent light source in order to approach and work on the circuit breaker panel board 1 when the power is out.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit breaker panel board comprising:
   a housing including a door structured to open;
   a circuit breaker receiving area disposed in an interior area of the housing, wherein the door is structured to open to provide access to the circuit breaker receiving area;
   at least one illumination unit disposed outside the circuit breaker receiving area and including at least one light oriented to provide light in a direction of the circuit breaker receiving area; and
   a power storage unit structured to store power and to provide power to the at least one illumination unit,
   wherein the power storage unit is deposed in the circuit breaker receiving area,
   wherein the circuit breaker receiving area includes a number of slots structured to receive circuit breakers, and
   wherein the power storage unit is installed in one of the number of slots.

2. The circuit breaker panel board of claim 1, wherein at least one illumination unit is disposed above the circuit breaker receiving area and includes at least one light oriented downward.

3. The circuit breaker panel board of claim 1, wherein the at least one illumination unit is a plurality of illumination units.

4. The circuit breaker panel board of claim 1, wherein the power storage unit is structured to provide power to the at least one illumination unit after the circuit breaker panel stops receiving external power.

5. The circuit breaker panel board of claim 1, wherein the power storage unit is rechargeable.

6. The circuit breaker panel board of claim 5, further comprising:
   a charging unit structured to charge the power storage unit.

7. The circuit breaker panel board of claim 6, wherein the charging unit is structured to use external power received by the circuit breaker panel board to charge the power storage unit.

8. The circuit breaker panel board of claim 6, wherein the charging unit is disposed in the circuit breaker receiving area.

9. The circuit breaker panel board of claim 8, wherein the circuit breaker receiving area includes a number of slots structured to receive circuit breakers; and wherein the charging unit is installed in one of the number of slots.

10. The circuit breaker panel board of claim 1, further comprising:
    a door sensor structured to detect whether the door is open,
    wherein the at least one illumination unit is structured to turn on the at least one light when the door sensor detects that the door is open and to turn off the at least one light when the door sensor detects that that door is closed.

11. The circuit breaker panel board of claim 1, wherein the at least one light includes at least one light emitting diode.

12. The circuit breaker panel board of claim 1, further comprising:
    a second illumination unit disposed inside the circuit breaker receiving area, the second illumination unit including at least one second light.

13. The circuit breaker panel board of claim 1, wherein the each of the at least one illumination units include a plurality of lights.

14. A circuit breaker panel board comprising:
    a housing including a door structured to open;
    a circuit breaker receiving disposed in an interior area of the housing, wherein the door is structured to open to provide access to the circuit breaker receiving area;
    at least one illumination unit disposed outside the circuit breaker receiving area and including at least one light oriented to provide light in a direction of the circuit breaker receiving area: and
    a motion sensor disposed on the housing outside the circuit breaker receiving area and being structured to detect motion in the vicinity of the circuit breaker panel board,
    wherein the at least one illumination unit is structured to turn on the at least one light when the motion detector detects motion in the vicinity of the circuit breaker panel board.

15. A circuit breaker panel broad comprising:
    a housing including a door structured to open;
    a circuit breaker receiving area disposed in an interior area of the housing, wherein the door is structured to open to provide access to the circuit breaker receiving area;
    at least one illumination unit deposed outside the circuit breaker receiving area and including at one light oriented to provide light in a direction of the circuit breaker receiving area: and
    a photo sensor disposed on the housing outside the circuit breaker receiving area and being structured to sense ambient light in the vicinity of the circuit breaker panel board,
    wherein the at least one illumination unit is structured to turn on the at least one light when the photo sensor does not detect ambient light in the vicinity of the circuit breaker panel board.

16. A circuit breaker panel broad comprising:
    a housing including a door structured to open;
    a circuit breaker receiving area disposed in an interior area of the housing, wherein the door is structured to open to provide access to the circuit breaker receiving area;
    at least one illumination unit deposed outside the circuit breaker receiving area and including at least one light oriented to provide light in a direction of the circuit breaker receiving area;

a motion sensor disposed on the housing outside the circuit breaker receiving area and being structured to detect motion in the vicinity of the circuit breaker panel board; and a photo sensor disposed on the housing outside the circuit breaker receiving area and being structured to sense ambient light in the vicinity of the circuit breaker panel board, wherein the at least one illumination unit is structured to turn on the at least one light when the motion detector detects motion in the vicinity of the circuit breaker panel board and the photo sensor does not detect ambient light in the vicinity of the circuit breaker panel board.

\* \* \* \* \*